June 25, 1935.  A. C. WOODRUFF  2,006,037
DREDGE AND DIVING BELL
Filed June 12, 1934  2 Sheets-Sheet 1
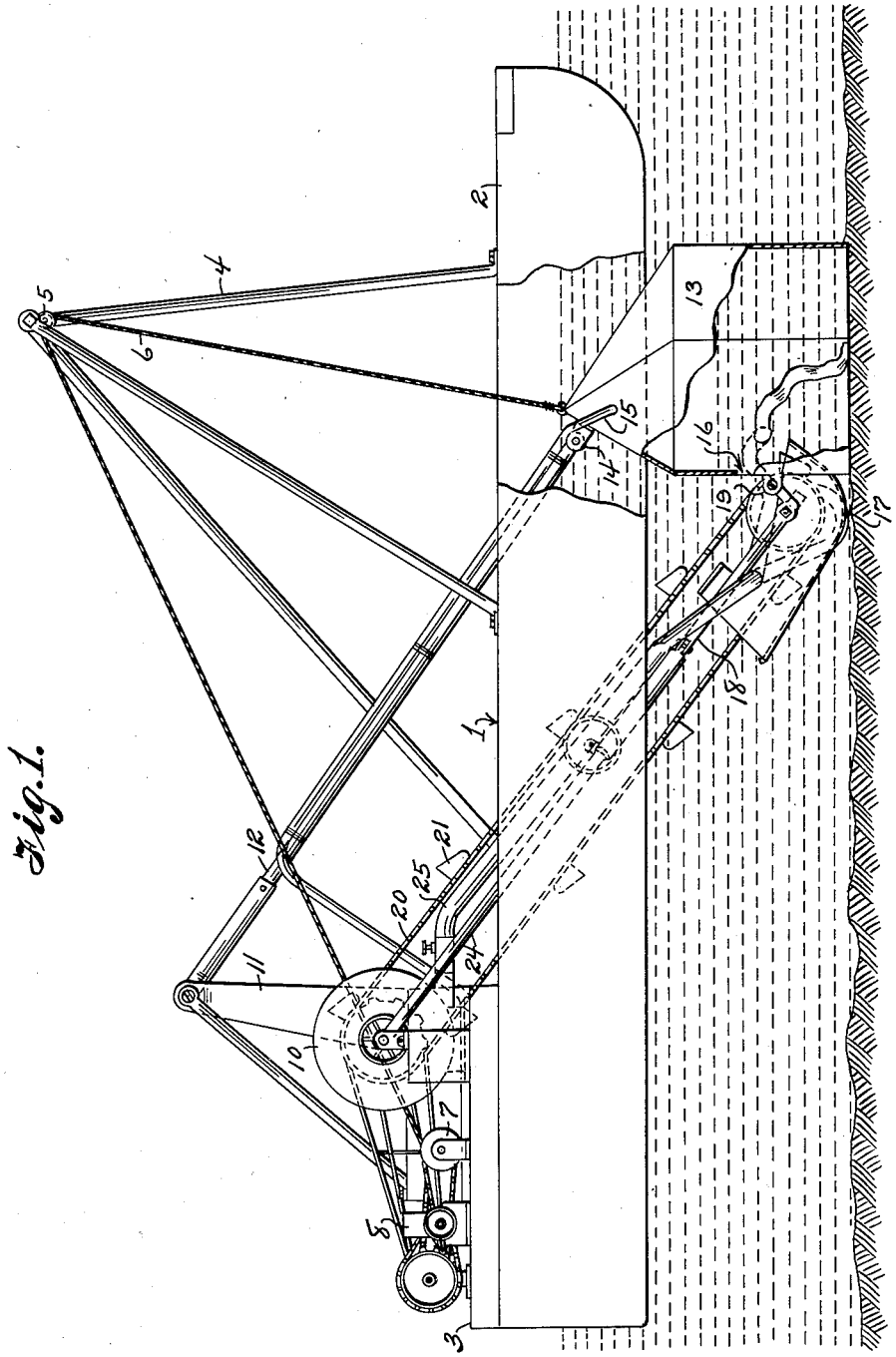

June 25, 1935.    A. C. WOODRUFF    2,006,037
DREDGE AND DIVING BELL
Filed June 12, 1934    2 Sheets-Sheet 2
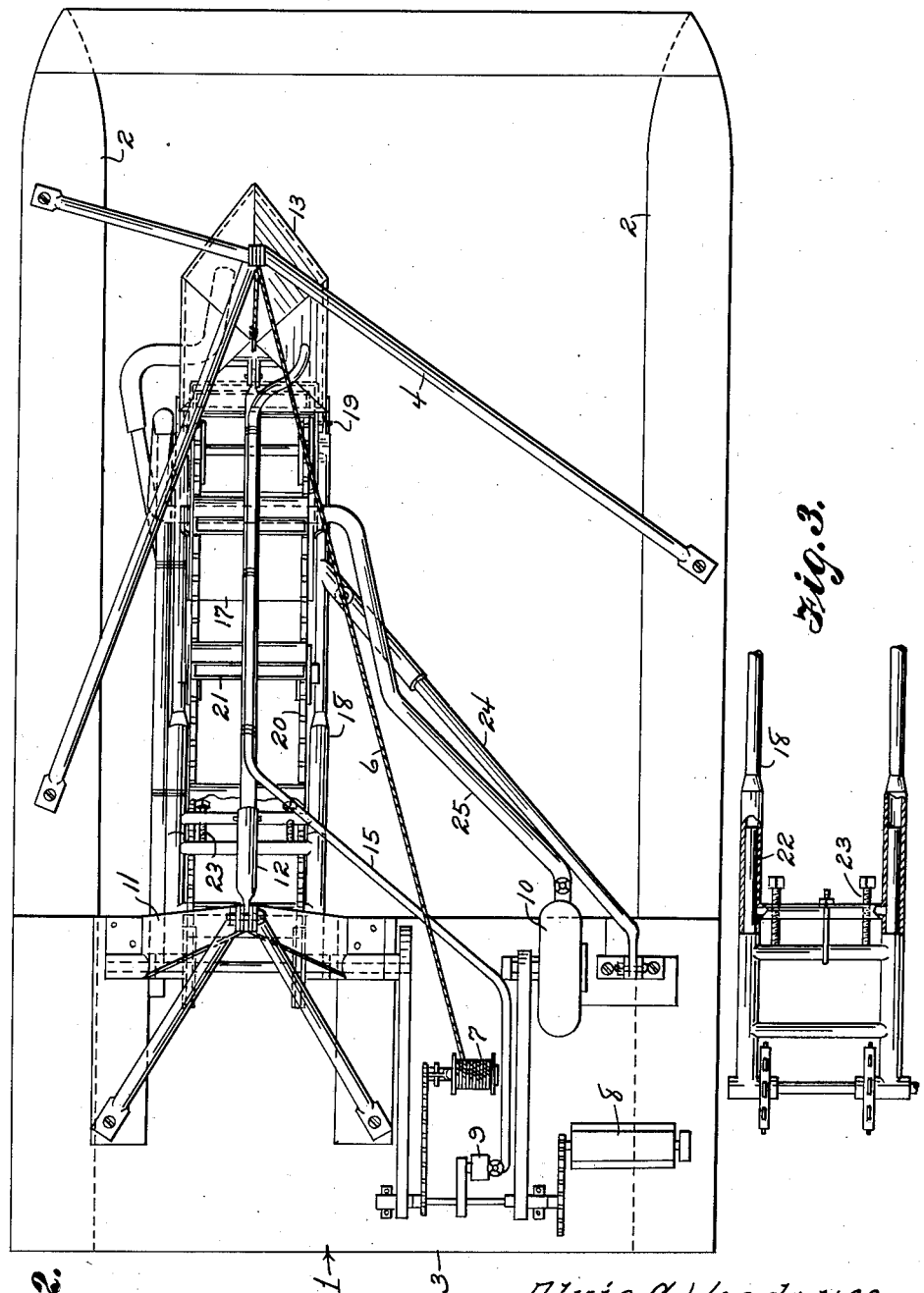

Patented June 25, 1935

2,006,037

UNITED STATES PATENT OFFICE 2,006,037

DREDGE AND DIVING BELL

Alvie C. Woodruff, Drewsey, Oreg.

Application June 12, 1934, Serial No. 730,330

2 Claims. (Cl. 37—56)

This invention relates to dredges or devices especially adapted for obtaining materials from the bottom of a body of water and has for the primary object, the provision of a power driven conveyor operating in conjunction with a diving bell provided with an air supply means so that a person may work on the bottom of the body of water to obtain and direct the material to the conveyor for elevation to the surface of the water by said conveyor.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a dredge and diving bell constructed in accordance with my invention.

Figure 2 is a top plan view illustrating the same.

Figure 3 is a detail sectional view showing the adjustment of the conveyor frame.

Referring in detail to the drawings, the numeral 1 indicates a float, consisting of spaced pontoons 2 connected by a platform 3. The pontoons are also connected by a derrick frame 4 carrying a pulley 5 over which a hoisting cable 6 is trained. One end of the hoisting cable is secured to and wound on a power driven windlass 7 mounted to the platform 3 and actuated by a prime mover 8 and the latter also drives an air pump 9 and a suction pump 10. A frame 11 is mounted on the platform 3 and has pivotally connected thereto a telescopic member 12 carrying at its free end a diving bell 13 of substantially conical-shape having its bottom fully open and its apex connected to the free end of the hoisting cable 6. The diving bell is pivoted to the member 12, as shown at 14, and has connected thereto an air supply hose 15 which is in turn carried by the member 12 and connected to the air pump 9. The hose permits the forcing of air into the diving bell when the latter is submerged or resting upon the bottom of the body of water, as shown in Figure 1. One side of the diving bell is provided with an entrance 16 to receive and permit to extend into the bell a conveyor scoop 17 carried by the lower end of a conveyor frame 18, the latter being hinged or pivoted to the bell, as shown at 19. The opposite end of the conveyor frame 18 is pivotally mounted to the frame 11 and supports an endless conveyor 20 of the type having buckets 21. The conveyor frame moves upwardly and downwardly with the bell through the operation of the hoisting cable 6. The buckets of the conveyor when passing about the lowermost end of the conveyor frame enter the diving bell which permits a person to readily shovel or deposit into said buckets material collected off of the bottom of the body of water within the bell. It is to be understood that a person can successfully operate and breathe within the diving bell when submerged in the water as air may be forced to the bell from the air pump. Suitable electric illumination may be provided for the interior of the bell for aiding the person working therein to see to deposit the material into the buckets. It is to be understood as the buckets reach the upper end of the conveyor frame they automatically dump the material onto the platform.

The conveyor frame is constructed of sections telescopically connected, as shown at 22, and are further connected by adjusting bolts 23 which permits the conveyor frame to be lengthened and shortened, as desired for the purpose of removing slack from the endless conveyor.

As will be apparent from Figure 2, the endless conveyor 20 is suitably connected to the power source or prime mover 8 for the purpose of driving the conveyor.

A brace 24 is provided between the platform 3 and the conveyor frame for guiding the movement of the latter. The brace 24 is of the telescopic type having a pivotal connection with the conveyor frame and is hinged to the platform. A suction tube 25 is connected to the suction pump 10 and extends into the bell so that the person within the bell may employ the pump 10 for obtaining material from the bottom of the body of water by suction. The suction tube 25 is suitably mounted to the conveyor frame so as to move with the latter as well as with the bell.

It is to be understood that the person or operator enters the bell 13 prior to lowering the latter into the water utilizing the part of the conveyor which extends into said bell as a place to stand upon so as to position the head well into the upper portion of the bell where the air is forced into the bell and the water kept from entering during submerging of the bell.

Having described the invention, I claim:

1. A device of the character set forth comprising a float, a derrick frame carried by said float, a diving bell movably connected to the float, a hoisting mechanism operating in connection with the derrick frame and connected to the bell for raising and lowering the latter, and a power driven endless conveyor movably mounted to the float and pivotally connected with the diving bell to move with the latter.

2. A device of the character set forth comprising a float, a derrick frame carried by said float, a diving bell movably connected to the float, a hoisting mechanism operating in connection with the derrick frame and connected to the bell for raising and lowering the latter, said diving bell having an opening in one wall thereof, and an adjustable conveyor frame pivotally mounted to the float and to the bell, a scoop-like element carrier by the frame and extending into the bell by way of said opening, an endless conveyor having buckets mounted on the conveyor frame so that said buckets during the travel of the conveyor may pass into and out of the diving bell, and a power means carried by the float for driving the conveyor.

ALVIE C. WOODRUFF.